May 21, 1968   W. J. MORLEY ET AL   3,384,874
SUPERVISORY SYSTEM HAVING REMOTE STATION SELECTION BY
THE NUMBER OF PULSES TRANSMITTED
Filed March 4, 1963

INVENTORS
WILLIAM J. MORLEY &
BY RICHARD M. GARRETT

Anderson, Spangler & Wymore

ATTORNEYS

| MEMORY REGISTER SWITCH | RECEIVER | INDICATOR | TRANSMISSION CONDITION | ALARM GATE | NORMAL GATE |
|---|---|---|---|---|---|
| OPEN | NORMAL SIGNAL INPUT | NONE | INTERROGATING | CLOSED | CLOSED |
| OPEN | NO SIGNAL INPUT | ALARM OR OUTAGE | STOP | OPEN | CLOSED |
| CLOSED | NORMAL SIGNAL INPUT | RETURN TO NORMAL | STOP | CLOSED | OPEN |
| CLOSED | NO SIGNAL INPUT | NONE | INTERROGATING | CLOSED | CLOSED |

Fig. 9

INVENTORS
WILLIAM J. MORLEY &
BY  RICHARD M. GARRETT

ATTORNEYS

INVENTORS
WILLIAM J. MORLEY &
BY RICHARD M. GARRETT

ATTORNEYS

United States Patent Office 3,384,874
Patented May 21, 1968

3,384,874
SUPERVISORY SYSTEM HAVING REMOTE
STATION SELECTION BY THE NUMBER
OF PULSES TRANSMITTED
William J. Morley, Wheat Ridge, and Richard M. Garrett, Denver, Colo., assignors to International Telephone and Telegraph Corporation, New York, N.Y., a corporation of Maryland
Filed Mar. 4, 1963, Ser. No. 262,555
2 Claims. (Cl. 340—163)

The present invention relates to communication systems for the transmission and processing of remote data and more specifically to a time sharing pulse code modulation system of the type indicated which is characterized by interrogation by a central station and sequential status replies by remote stations, utilizing a common communications link therebetween. This invention lies substantially in that portion of the field of supervisory systems which is primarily devoted to the indication from a plurality of remote locations of binary data, that is to say, an "on" or "off" or "GO NO-GO" condition. Conventionally, this type of system has found its greatest usage as a monitor of normal and alarm or other status conditions in one or more stations remote from a central observation point. Indications of excessive temperatures or pressures, the presence of persons or things, condition of doors and windows, and equipment failure are only a few of the varied functions performed by such a system.

Generally, three methods have found use in the prior art. In the first, sometimes referred to as a self-initiating system, a signal is transmitted from the remote station being monitored only when a change of condition occurs, there being no information received at the monitor during a "normal" period. The system inputs are scanned continuously and when a change of status occurs, as determined by memory elements at the remote station, the transmitter is automatically switched on to report the change of status. In a free running system status reports are continuously transmitted by the remote stations either sequentially for time division systems or simultaneously for frequency division systems. The third system, and the one forming the basis for the present invention, includes master station apparatus which interrogates multiple remote station installations at a given interval and a reply is given by the remote station which is processed by a central monitor station.

Providing satisfactory communications links between monitor and remote locations has always created the largest problem involved with such a system. In many cases the remote stations consist of paying subscribers and when each remote station requires an independent communications link with the monitor the costs may become prohibitive, especially when direct wire lines are used and the distance between monitor and remote stations is great. Reference is made to direct wire lines because that appears to be the least expensive means of communication for such commonly occurring businesses as burglar alarm systems.

The past has seen many efforts to consolidate systems having multiple communications links either by selective grouping of remote stations or time or frequency sharing of one link, however, either the solutions have become too costly or they fail to accommodate other system criteria.

In addition to freedom from multiple communications links a monitoring system should be capable of handling large numbers of remote stations at distances up to 150 miles for direct wire systems; it should also be capable of continuous interrogation or monitoring of remote stations or doing so at least at such frequent intervals of time that the monitoring is substantially continuous; it should be capable of distinguishing between a true alarm condition and an outage or equipment failure type of alarm; and it should be able to store information concerning any alarm condition or conditions at one or more remote stations while proceeding to monitor or scan all other stations in the complex without the further reporting of alarms already announced.

It is the primary objective of the system of the present invention to provide all of the foregoing criteria, while at the same time using only a single communications link, the monitor and all remote stations being in parallel on a wire system and collectively on the same radio frequency in a wireless system.

It is a further object of the invention to provide a supervisory system wherein the transmitted address or individual remote location code is similar for all remote stations and said stations respond after a predetermined accumulation of interrogation pulses.

A still further object of the invention is to provide a system containing a master station and multiple remote stations which are sequentially interrogated by the former and wherein the only synchronization between master and remote during a scanning frame is a series of interrogation pulses which primarily function to query each remote station as to its status.

A further object of the invention is to utilize the interrogation pulse intended specifically for one remote station as a portion of the address or code for all other remote stations.

Another object of the present invention is to provide a system as aforesaid in which the interrogation of remote stations may be terminated at any time during a scan and for any length of time without the master and remote stations getting out of synchronization or step with one another.

Still another objective of the invention is to provide a novel and improved digital logic device for processing the received signals from the remote stations.

In achieving these fundamental objectives it will be seen that the prior art is also advanced by other improvements which will be both apparent and specifically referred to as the description proceeds.

An explanation of how these and other objectives of the invention are accomplished is set forth in the following detailed description of the preferred embodiment of the invention taken in conjunction with the accompanying drawings in which:

FIGURE 4 is a detailed block diagram of the central monitor transmitter and receiver unit, and transmitter logic circuits, including the memory register. All elements in this and other figures of the drawings having a black dot associated therewith shall be taken to mean that the element is shown as being turned ON.

FIGURE 5 is a detailed block diagram of the receiver logic, detector, and indicator circuits. FIGURE 5 is a continuation of FIGURE 4, the electrical connections designated as A, B, and C on each of the two figures being the same. In both of FIGURES 4 and 5 the diagrams are representative of the circuit conditions immediately following the transmission of an interrogate pulse by the monitor station and prior to the arrival of a reply pulse from a remote station.

FIGURE 14 is a block diagram of a typical remote station having a multiple output counter and multiple alarm sensing means.

SUMMARY OF INVENTION

At the outset of the description of the invention it must be understood that a "communications link" can mean either a direct wire connection including a dual wire circuit or a single wire and ground or it can be interpreted to mean a wireless electromagnetic means of communications. Although but one means of keying the transmission medium is set forth in this specification, it is recognized that the system of pulse code modulation described can be easily adapted to various communications systems such as straight line keying, or modulation of one or more subcarriers by phase shift or frequency shift keying or straight amplitude modulation. For purposes of the following description however, a dual wire communications channel is contemplated—a type of low grade wire facilities which may be leased from local telephone and telegraph companies.

Since most of the discussion will center about digital techniques and the use of electrical pulses, either plus or negative in nature, it is also to be understood that other embodiments of apparatus can be produced which fall within the scope and spirit of the invention which may utilize the absence of a pulse, the inversion of a pulse, or some other type of modulation where the specification calls for the presence of or specific polarity of a pulse, voltage or waveform. As those skilled in the art will recognize, the description of the pulses are mere references to change of electrical condition and a variety of techniques may be devised to accomplish the functions set forth without departing from the spirit and scope of the appended claims.

The typical monitoring system for which this invention is intended to provide comprises a central monitoring station, usually manned by one or more individuals, a number of remote stations positioned at factories, stores, unattended service facilities and other desired locations, all of which are interconnected in electrical parallel relationship by a transmission line. The purpose and function of the system is to provide an indication at the central monitor point of the existence of alarm or limit condition at a remote station.

Figure 1:
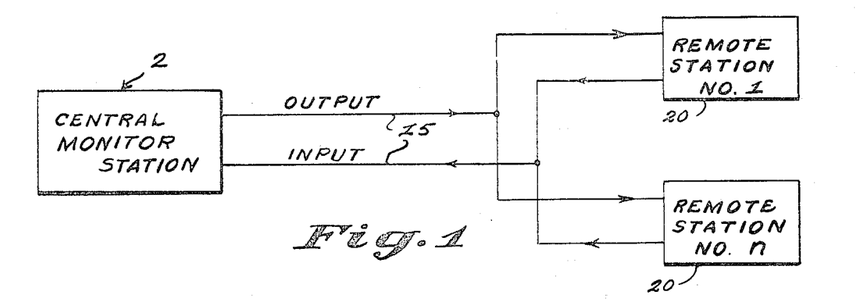
FIGURE 1 is a basic block diagram of the complete system of the present invention showing the single link interconnection of the central monitor station and the remote stations which are being monitored.

Basically, the combination of elements of the system comprise means at the remote stations which are responsive to the reception of a given interrogating pulse transmitted from the monitor and which means transmit during normal conditions at the remote station a reply pulse which occurs within a fixed time interval following the given one of the interrogating pulses. Means are also provided at the remote station which are operative in the event of an alarm condition for cyclically displacing the reply pulse from its fixed time interval following in interrogate pulse, which displacement is detected by further means at the monitor station and displayed as an indication. These basic and very fundamental aspects of the inventive system are illustrated in block diagram form in FIGURES 1 and 2 to which reference is now made.

Figure 2:
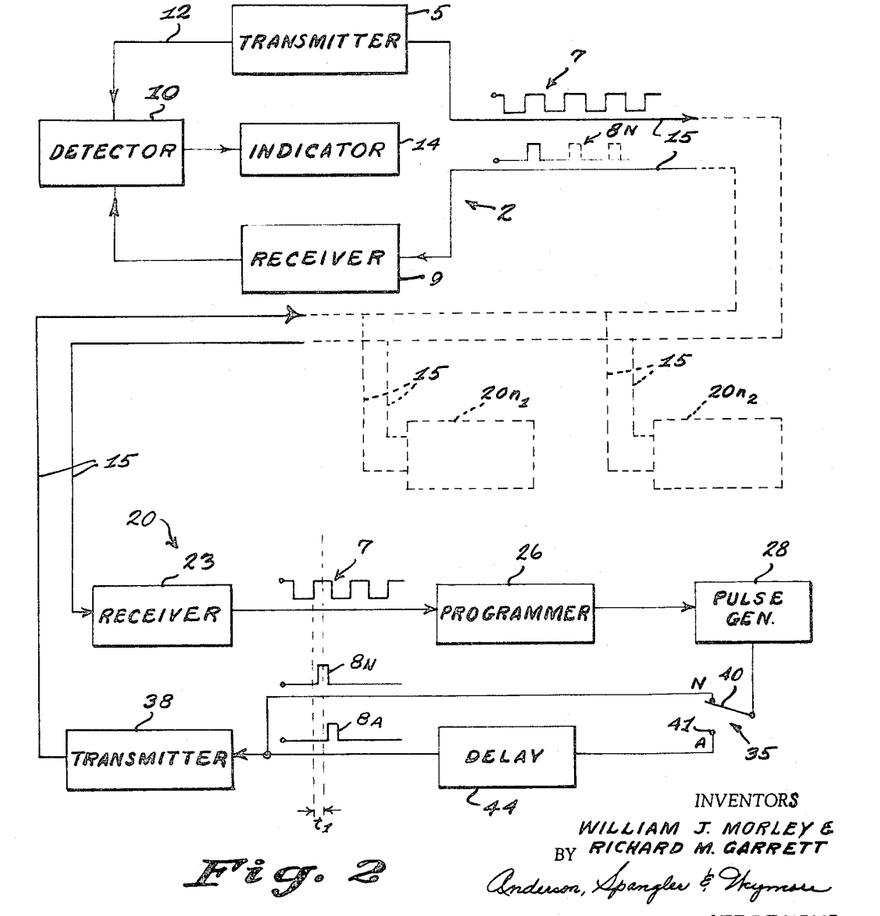
FIGURE 2 is a block diagram showing the basic make-up of the central monitor station and a typical one of the remote stations.

Generally indicated by reference numeral 2 in FIGURE 2 of the accompanying drawings is the central monitor station comprising a transmitter 5 which generates and transmits at least one frame of interrogating pulses 7 whose number in each frame is at least equal to the number of remote stations, points or channels being monitored. A receiver 9 is included for receiving and amplifying the incoming reply pulses 8 from the remote stations which are normally interleaved between the outgoing interrogating pulses 7. A detector unit 10 receives a reference signal from an output 12 of the transmitter 5 and the amplified reply pulses 8 from the receiver 9 and determines by comparison of its two inputs whether or not an alarm condition exists at any one of the remote stations being scanned by the interrogating pulses 7 from the transmitter 5. When an alarm condition is detected an output is directed to an indicator means 14 which may include a printer or a visual or auditory device to apprise the operating personnel that an alarm condition has developed in a remote station. By appropriate means the indicator unit 14 also denotes which of the several remote stations are in an alarm condition. Broadly, an alarm condition, unless otherwise specifically specified, means a true alarm or the reaching of a limit condition at a remote station or an outage of transmission line or equipment at the remote station.

A dual wire transmission line 15 interconnects the central monitor station 2 with a plurality of remote stations, generally indicated by the reference numerals 20, $20n_1$, and $20n_2$, the latter two reference numerals indicating other identical remote stations.

Each of the remote stations 20 includes first a receiver 23 to accept and amplify the incoming interrogating pulses 7 from the central monitor transmitter 5. From the receiver 23 the pulse train 7 is routed to a programmer, or counter 26 whose function it is to initiate the operation of a subsequently connected reply pulse generator 28 when the predetermined time comes for that particular remote station to answer the interrogations from the central monitor station 2.

Before continuing with the explanation of the remote station apparatus the time sharing feature of the operation should be made clear. As stated earlier in the description, a frame or series of interrogating pulses 7 from the monitor station transmitter 5 comprises a number of spaced-apart electrical pulses whose number is at least equal to the number of remote stations being scanned or monitored. Each of these pulses 7 interrogates one remote station and therefore, following the transmission of each pulse a time interval is provided in which the interrogated remote station's reply pulse is transmitted to and received by the monitor station receiver 9. One by one the remote stations are thus interrogated and each responds with a reply pulse, assuming that there is no equipment or transmission line malfunction or outage.

Figure 8:
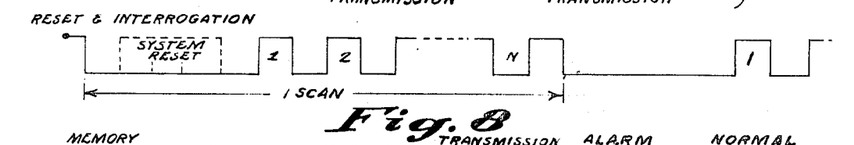

Since all of the remote stations are connected in a parallel relationship on the same transmission line, the receivers 23 in each remote station will receive all of the interrogating pulses 7 and hence means are provided to limit the response of each remote station to that particular interrogating pulse which is intended to summon an answer therefrom. As will be explained later in greater detail, a programmer unit 26 provides this function by counting and keeping track of the interrogating pulses which have appeared on the line 15 and when that number pulse is received which corresponds to the preset response number of the programmer an output is produced from the programmer which triggers a reply pulse generator 28 into operation for the generation of a single reply pulse 8N. The reply pulse generator 28 is then inactive until the same number interrogating pulse is received in a subsequent scan and is singularly identified by the counter 26 in similar fashion as the one just described. (The counter unit is reset by a long duration reset pulse from the transmitter 5 at the end of each frame so that the counter unit 26 starts from zero count with each new scanning frame. See FIGURE 8.)

It may be seen by reference to FIGURE 2 that the generated reply pulse may take one of two possible paths within the remote station depending on the selective position of the condition switch 35 connected in series with the output of the pulse generator 28. The condition switch may be operatively attached by appropriate means to a door, window, or other mechanical apparatus or may be an electronic switch which operates from the output of other condition responsive devices, such as a photocell or capacitance circuit. However, until a condition which shall be known as "alarm" is developed the switch 35 remains in the position shown in FIGURE 2, thus routing the reply pulse 30 directly to a remote station transmitter 38 which broadcasts the reply pulse over the communications link within the alotted space time interval between interrogation pulses. However, if the wiper arm 40 of the switch has effectively been transferred by an "alarm" condition to the lower contact 41 of the switch 35 the reply pulse will be fed to a delay means 44 before being transmitted to the monitor station, resulting in a cyclic time displacement of the reply pulse 8A which will prevent it from reaching the monitor station within a specified time interval $t_1$. The failure of the reply pulse to appear within the time interval $t_1$ is thus interpreted by the detector 10 in the monitor station as an alarm condition "A" at the remote station 20. If a reply pulse is not received at all within a predetermined "waiting" period following the time interval $t_1$, and during which further transmission is terminated, the detector 10 provides an "outage" signal "X" to the indicator 14. In either case further scanning is prohibited until the alarm or outage condition is acknowledged by automatic or manual means.

With the salient features of the method and apparatus of the present invention set forth the description will now proceed to a more detailed view of the invention together with an explanation of the inventive improvements and sophistications of the already described basic system which makes the apparatus commercially practical and efficient.

Figure 3:
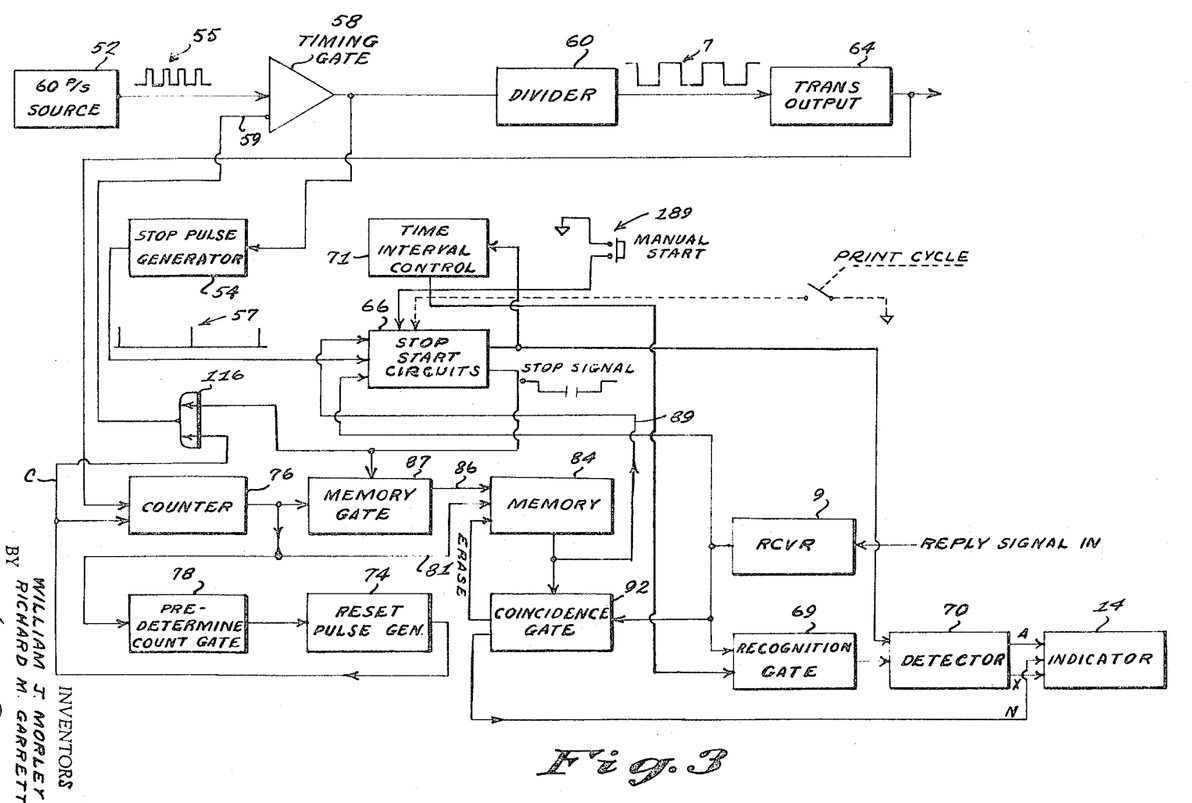
FIGURE 3 is a generic functional block diagram of the central monitor station.
Figures 3, 4:
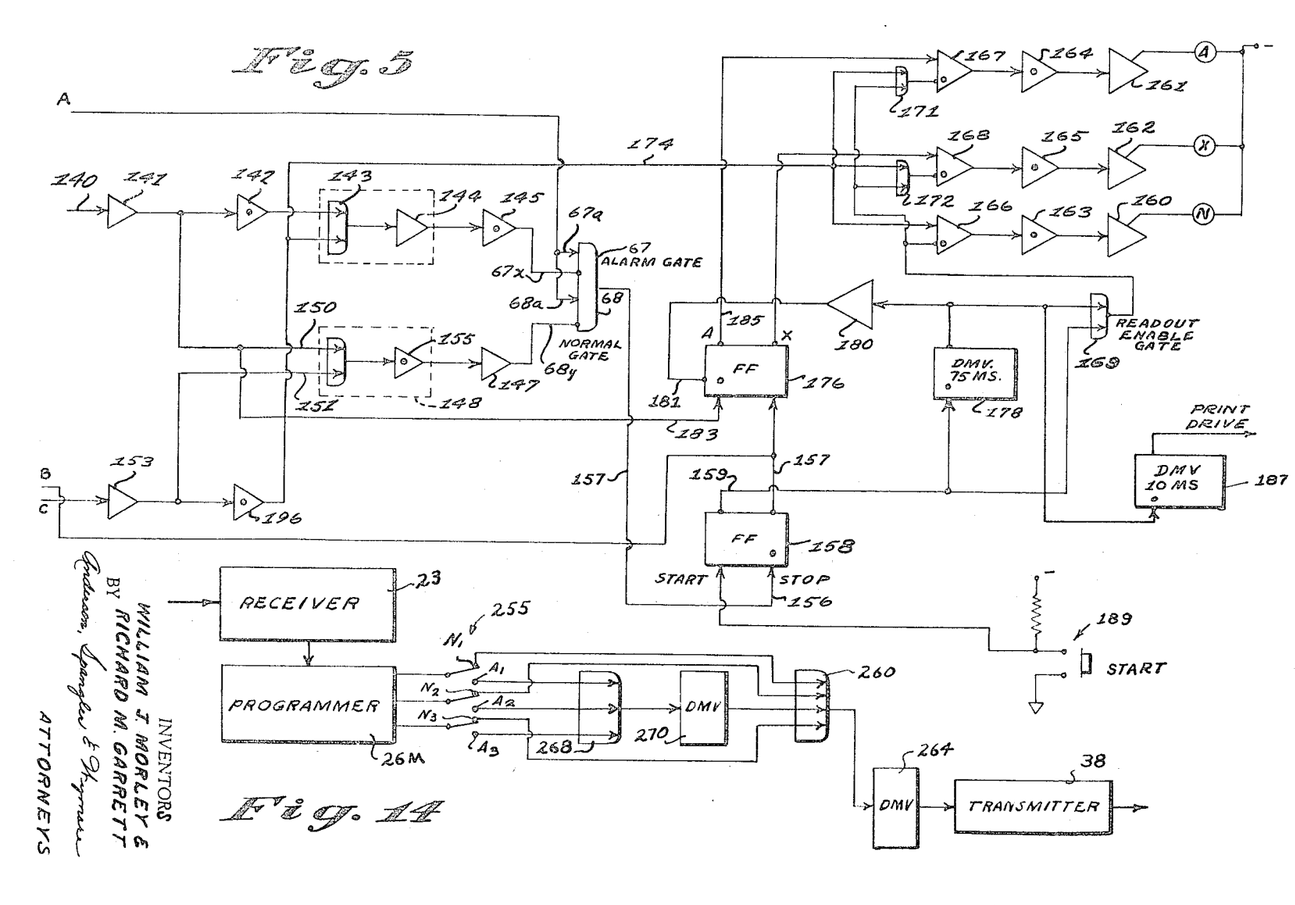
Figure 4:
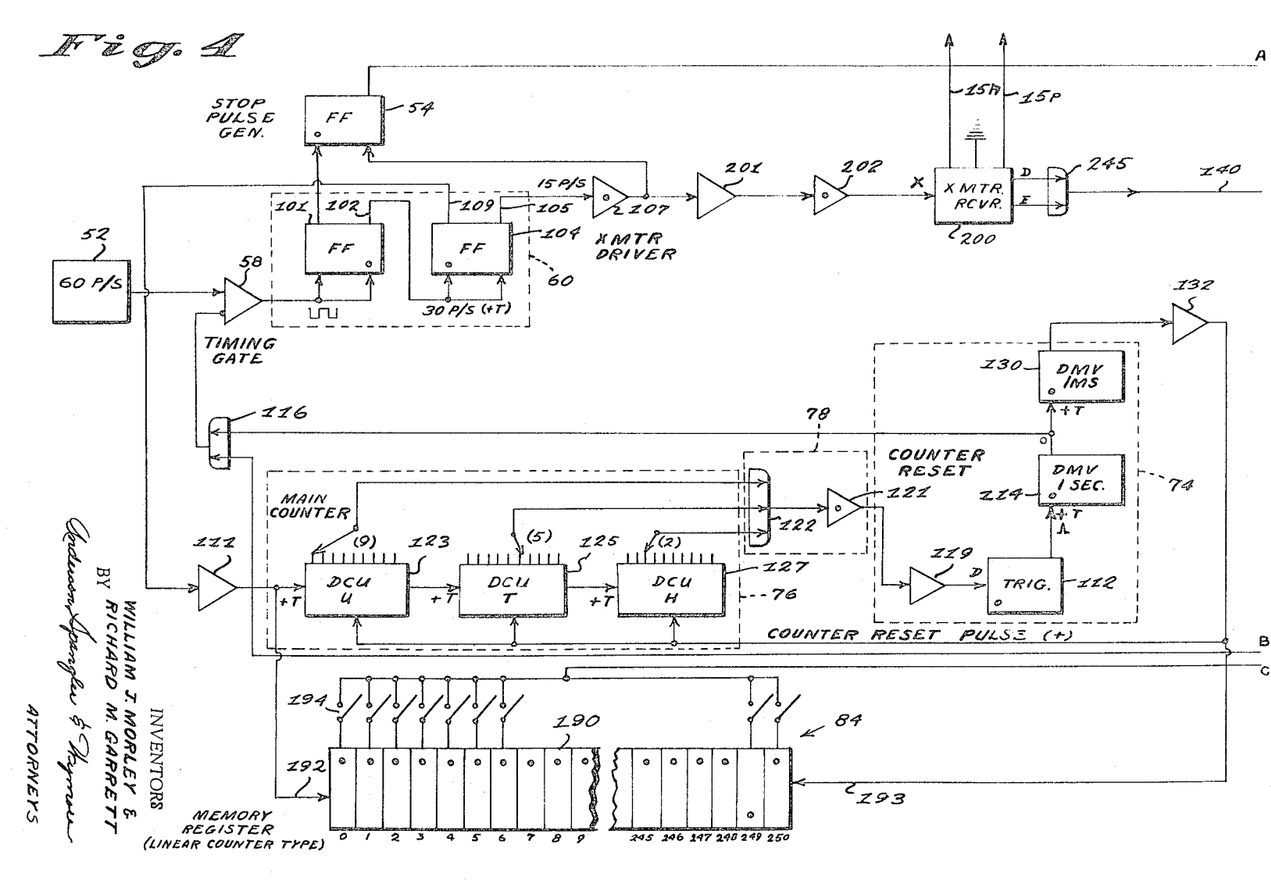

To facilitate the disclosure, the detailed explanation will be divided into four areas, to-wit: Central Monitor Operation, Central Monitor Logic Circuitry, Central Monitor Transmitter and Receiver, and Remote Stations. The "logic" portion of the central monitor is that portion which generates and handles the information "bits" which comprise the system intelligence, exclusive of the actual power transmitter and the receiver which are connected directly to the transmission line. The initial discussion of the operation of the central monitor will make reference to and concern the block diagram of FIGURE 3 which makes use of interrelated generalized blocks to broadly illustrate the functions necessary to implement the system as it is conceived in the preferred embodiment of FIGURES 4 and 5. FIGURE 3 is not intended to be a condensation or reduced scale of the block diagram of the preferred embodiment which is shown in FIGURES 4 and 5.

*Central monitor operation*

Figure 7:
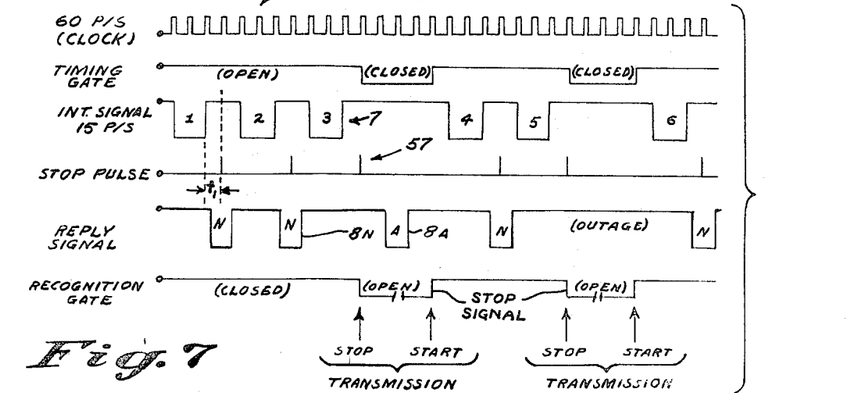
FIGURES 7 and 8 illustrate wave forms used in explaining the invention.

Referring now to FIGURES 3 and 7, it is seen that the transmitter interrogation pulse output 7 is derived initially from a source 52 of energy having sixty pulses per second as its constant output, which output may be referred to as the clock pulses 55. The method of the present invention is perfectly suited to other frequencies and in wireless communications different frequencies are in fact chosen, however, when the sixty cycle pulse rate is divided down a fifteen cycle per second frequency may result which is suitable for a low grade transmission line.

Traced from the sixty cycle source 52, the clock pulses are normally fed through a timing gate 58 and into a frequency divider circuit 60, emerging therefrom as a train of square wave pulses 7 which are directed into the transmitter power output circuitry 64 and put onto the transmission line 15 as a series of interrogation mark pulses 7.

Reply pulses 8N returning from the sequentially interrogated remote stations are respectively received by the monitor receiver 9 within the space time following each of the interrogation mark pulses if the reply pulse is normal and has not been delayed to signify an alarm condition. To determine whether a returning pulse is within normal limits or has been delayed due to an alarm condition the "stop-start circuits" 66 compare the received reply pulse with a time reference or synchronizing input 57 which will be referred to as a "stop-pulse" 57 because of its function in effecting the stoppage of transmission. The stop pulses, originating in the stop pulse generator 54 which is synchronized by a clock pulse input from the timing gate 58, are positioned centrally of each space time interval in the interrogation pulse train 7 and are directed to one of the input connections of the stop-start circuits 66. A second input to the stop-start circuits is taken from the receiver output. When the leading edge of a received reply pulse reaches the stop-start circuits 66 prior to the stop pulse 57 the stop circuits produce no output. However, if one of the stop pulses arrives at the input of the stop-start circuits 66 prior in time to the returning reply pulse (as it will in the case of an alarm condition at the remote station) a stop signal will be generated and emitted from the circuits 66 along a connecting electrical path to an OR gate 116 whose output is routed into the "inhibit" input of the timing gate 58. The inhibiting of the timing gate by the stop signal closes the timing gate 58 and further passage of clock pulses 58 is prevented and transmission is terminated.

The reason for stopping the transmission is two-fold. First, if transmission were to continue, the next outgoing interrogation pulse would interfere with the delayed reply pulse, and alarm or outage conditions could not be distinguished from one another. Secondly, without some delay being inserted before the next interrogation pulse is transmitted there would be insufficient time to record the presence of an alarm or outage condition within the time interval as depicted in the illustrated embodiment. It is most desirable, and in fact necessary in most alarm systems, that the alarm or outage condition be recognized and acknowledged either by the central station monitor operator or by automatic means such as a tape printer which will preferably record the nature of the alarm condition, that is, true alarm or outage, the time of the first recognition of the occurrence and the identity of the station effected. Thus it is seen that the duration of the closed period for the timing gate 58 is a function of the equipment used to record the fault if automatic means are employed to acknowledge the alarm condition or the duration may depend entirely on the responses of an operator in restarting the transmission after he has manually acknowledged the condition. In either case the timing gate is closed or inhibited during the existence of a stop signal produced by a stop pulse and until a "start" signal is applied to the stop-start circuits.

In a prior portion of this disclosure it was pointed out that reply pulses which signify an alarm condition at the station from which they were transmitted are pulses 8A which are delayed by the remote station and therefore do not arrive at the stop-start circuits 66 prior to the stop pulses. Obviously, however, if the remote station were inoperative and failed to transmit any reply signal at all it would appear to the monitor station as an infinitely delayed reply pulse. Consequently, means are provided to distinguish between a legitimately delayed alarm pulse 8A and the complete absence of a reply pulse, the latter being interpreted as an outage or equipment failure.

The presence of an output from the stop-start circuits 66 becomes an enabling input to a recognition gate 69 which is thereby opened for a finite time interval to allow the passage from the receiver 9 of the delayed reply pulse 8A if it is present. If the reply pulse is admitted through the recognition gate within the said time interval, or "waiting time" a detector 70 coupled to the recognition gate provides an "alarm" signal "A" to the monitor indicator 14. However, if the waiting time interval comes to an end and a reply pulse has not been admitted through the recognition gate to the detector, an "outage" output "X" from the detector 70 will be applied to the indicator 14.

The duration of the "waiting interval" is determined by circuitry identified in FIGURE 3 as the time interval control 71, the function of which is to provide an enabling signal to the recognition gate 69 for a predetermined length of time which begins with an output from the stop-start circuits 66. If no reply pulse is received during the enabled period of the recognition gate 69, the detector responds at the end of that period with an "outage" signal "X" to the indicator means 14.

Once the announced condition has been acknowledged and recorded the scanning of the other remote stations may be resumed. The technique for re-starting the transmission depends to a large extent on the equipment used to produce the record and acknowledge the change of condition. Exceptionally high speed print-out apparatus can record the desired information in so short a time that further delay is not required, however more conventional recording or print-out devices require several milliseconds for their operation and a special delay is necessary before resuming transmission to provide time for the operation of the equipment. In such cases the termination of the print cycle can be made to automatically terminate the stop signal, as shown by the dotted line input to the stop-start circuits 66. In instances where the re-starting of the scanning is accomplished manually, a switch 189, or similar means, provides an input to the stop-start circuits 66 which will terminate the stop signal and restart transmission.

While pointing out the necessity in the preferred form for stopping transmission of the interrogating pulses upon the occurrence of given conditions, it must be pointed out that this requirement may be dispensed with in a system having a greater time space between pulses than the one being described. Without departing from the teachings of the present invention a long duration space time can be utilized in the same manner as the "waiting interval" referred to above, with the time for the return of a normal reply pulse, an alarm pulse, and the print-out cycle time all being included in the interval between each interrogation pulse being transmitted. Shortening the time space between pulses, however, increases the number of stations which can be interrogated in a given time thus providing an offsetting advantage to the elimination of the requirement for stopping the scan whenever a change of condition occurs.

Continuous repetitive scanning of all remote stations is one of the stated objectives of the invention. To this end there is provided a system reset signal which is operative at the end of each scanning frame to reset the counters of the system to zero count so that a new interrogating and scanning cycle may be started. A reset pulse having a time duration of approximately ten times that of the pulse-space time is generated by a reset pulse generator 74 when an appropriate signal is received at the input of the reset pulse generator. The transmitter's output signal is fed to a counter unit 76 which counts the number of pulses applied thereto, supplying an output to the predetermine count gate 78 for each pulse counted. The predetermine count gate passes the counter output to the reset pulse generator at the time of its receiving the number of pulses equivalent to the number of remote stations or channels being monitored. At the conclusion of the interrogation of all remote stations the transmitted reset pulse actuates all remote counters to a reset or zero count position ready for the next cycle of interrogation pulses from the central monitor station, while at the same time resetting the monitor counter 76.

Although not specifically set forth as such at the outset of the disclosure, one of the objectives of the system of the present invention is to provide means for continuing the sequential scanning of all remote stations after one or more of them has indicated an alarm or outage condition without stopping the scan each time such a station is passed in the normal scanning sequence. To accomplish this purpose of the system circuitry is provided which stores information relative to the identity of the abnormal station or stations and functions to effectively by-pass those stations in subsequent scans until the situation at the remote station is corrected.

Referring once again to the block diagram of FIGURE 3, an output 81 of the counter 76 is fed as a reference signal to a first input of a memory register device 84 which also has a second information input 86 coming from the output of a memory gate 87 which is normally closed and prohibits the passing of the counter output pulses applied thereto. The memory gate 87 is triggered open by the application of the stop signal arriving from the output of the stop-start circuits 66 which, it will be remembered, occurs during an alarm or outage condition at one of the remote stations. When a reference pulse from this counter arrives on the memory input 81 simultaneously with an information input from the memory gate 87 on the second memory input 86, the information will be recorded in the memory unit as having been derived from the remote station which is represented by the particular reference pulse appearing at the same time. During each subsequent interrogation of the particular station whose information is stored therein, an output 89 is produced by the memory unit which is applied to an input of the stop-start circuits 66 and acts therein as a substitute for the absent "normal" reply pulse from the remote station, thus preventing the stop circuits from emitting a stop signal for that particular station so that the scan can continue without interruption.

When the remote station has returned to a normal condition and a "normal" reply pulse is once again received by the central monitor receiver 9 it is routed to a coincidence gate 92 which also receives the selective output 89 of the memory unit 84. Now, when the scan reaches the remote station which has been restored from "alarm" or "outage" to normal condition, the memory unit output 89 and the genuine "normal" reply pulse 8N will coincide, thus acting to open the coincidence gate 92 and permitting an erase signal to be applied to the memory unit to eliminate the stored information relative to that particular remote station.

The so-called erase "signal" need not be confined to an electrical impulse or an "erase" voltage, but can also be taken to mean the act of an operator in opening a switch in a system wherein the switch closure is the memory input such as the manually operated system of the specific embodiment disclosed in FIGURES 4 and 5. It will be apparent to those skilled in the art that the capacity of the memory unit 84, either in switches, magnetic cores or the like, will be at least as great as the number of remote stations being monitored in order that the requisite amount of information may be stored at one time.

Having explained the generic aspects of a central monitor station and its operation within the system, a more detailed explanation of a specific embodiment will be given in connection with FIGURES 4 and 5, with collateral references being made to FIGURES 10, 11, 12, and 13. The function and operation of the so-called building blocks which comprise the circuits hereinafter set forth are well known components of the digital computer are and will therefore not be described, in extensive detail, although some are additionally illustrated schematically in FIGURES 10, 11, and 12.

*Central monitor logic circuitry*

The transmitted interrogation pulses begin with a source 52 of sixty cycle per second clock pulses 55, which selectively may be negative going or positive going, which is connected to a gated inverter, previously described as the timing gate 58. As will be most apparent to those skilled in the art, the inhibit inverter depicted as the timing gate 58 is of the inverter type shown in more detail in FIGURE 11, wherein a negative voltage applied to the base of the inhibit PNP transistor causes that transistor to conduct, thereby reducing its collector voltage substantially to zero and also the connected base of the inverter transistor which maintains it turned OFF. From the output of the inverter 58, the clock pulses are applied in electrical parallel to the set and reset inputs of a flip-flop circuit 101. The reset output 102 of the flip-flop circuit 101 provides a complimentary input to a second flip-flop circuit 104 whose reset output 105 is applied to an inverter 107. Since only every other pulse of the applied clock pulse train 55 produces a reset output 102 in the first flip-flop circuit 101 and the same is true of the second flip-flop circuit 104, the resulting second reset output 105 is a fifteen cycle per second chain of electrical pulses. The set output 109 of the second flip-flop circuit 104 provides an out-of-phase output of fifteen pulses per second to a counter input inverter 111 and thence to the input of the main counter unit 76. Three decimal ring counters 123, 125, and 127 are shown in the illustration of the preferred embodiment, however, the exact number of counter units would depend on the number of stations actually being monitored. In the exemplary showing of FIGURES 4 and 5 it will be assumed that 250 stations are being monitored and at the end of a complete interrogation scan the reset pulse will reset the remote station counters to zero count, as well as those of the central monitor main counter 76.

The system reset pulse is produced by closing the timing gate 58 during a transmitted pulse period so that the pulse will continue for an extended time duration. To close the timing gate 58 for a given period of time an output is derived from a one second delay multivibrator 114 which, when applied to an OR gate 116 passes therethrough to become an inhibiting input to the inverter 58, preventing the passage of clock pulses 55 during the presence of the inhibiting signal input.

The delay multivibrator 114 is triggered on by a voltage spike from a Schmitt trigger circuit 112 which is in turn activated by the positive going output voltage from the second of a pair of series connected inverters 119 and 121. The first one 121 of the said two inverters, when viewed in series combination with a multiple diode input gate circuit 122, forms a coincidence NOR gate, which has previously been referred to as the predetermine count gate 78. To initiate the reset pulse, it is necessary that the second series reset circuit inverter 119 turn on at the time of reaching the predetermined count. As shown in FIGURE 4, any negative voltage input to the diode gate 122 will keep the first invester 121 turned ON and the second inverter turned OFF. However, when the appropriate count for reset operation is reached and a zero voltage output is present on all of the decimal counter units the input to the NOR gate inverter will disappear and the first inverter 121 will turn OFF and initiate the chain of events which triggers the reset pulse.

The number of diode inputs to the gate circuit 122 will be equal to the number of decimal counting units being employed. In the illustrative embodiment three counting units 123, 125, and 127 are shown representing respectively units, tens and hundreds.

In the receiver portion of the central monitor station the ALARM and NORMAL gates 67 and 68 and their input devices occupy pivotal positions in the operation of the system. It is here that the timely or late arrival of a reply pulse is detected and it is from the output of these gates that the stop pulse passes to cause the generation of the stop signal and the termination of transmission. Since the ALARM and NORMAL gates have but one joint output 157 it will be convenient to refer to them collectively as the stop-start gate. This gate is a double channel or two sided diode gate having two externally tied parallel inputs 67a and 68a connected to the two sides of the gate respectively and separatee "inhibit" voltage inputs 67x and 68y connected to each of the gate sides respectively. If both inhibit lines are activated with a negative input voltage, the stop pulses 57 will pass through neither side of the gate. If only one of the inverters 145 and 147 which immediately precede the said inhibit inputs is OFF and a voltage is present at its output, the particular gate to which it is fed will be closed.

Considering that a normal reply pulse 8N is received and routed from the initial receiver OR gate 245 to the receiver logic circuitry on a connection 140, the first series inverter 141 will turn ON, thus switching the next series inverter 142 OFF. The voltage output from the second inverter 142 passes through an OR gate 143 and turns ON a third inverter 144 whose output turns OFF the fourth inverter 145 whose voltage output is applied as an inhibiting input to the stop pulse ALARM gate 67. At the same time the second one 68a of the parallel connected stop pulse inputs, directed to the NORMAL gate 68, is also inhibited by the impressed negative voltage output of a normally OFF inverter 147, consequently preventing the stop pulse 57 from passing through either the ALARM or NORMAL gates 67 and 68.

Before proceeding to explain the detection and stop-start circuits one further look at the inhibit input circuitry to the NORMAL gate 68 would further clarify the disclosure. The NORMAL gate inhibit input inverter 147 is fed by the output of a coincidence NOR gate 148, the diode input of which is characterized by two inputs 150 and 151 connected respectively to the outputs of the first receiver logic inverter 141 and a normally OFF inverter 153 at the output of the memory register 84. If either of the inverters 141 or 153 is OFF a voltage will be present at one of the inputs to the NOR gate 148, causing the NOR gate inverter 155 to remain ON creating an inhibiting voltage from the inhibit input inverter 147.

Figure 9:
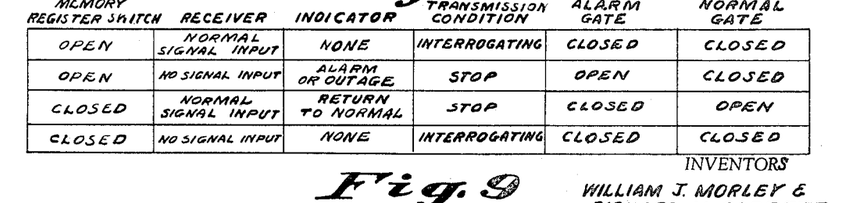
FIGURE 9 is a chart illustrating the possible conditions of the receiver logic ALARM-NORMAL gate which appears in FIGURE 5.
Figure 10:
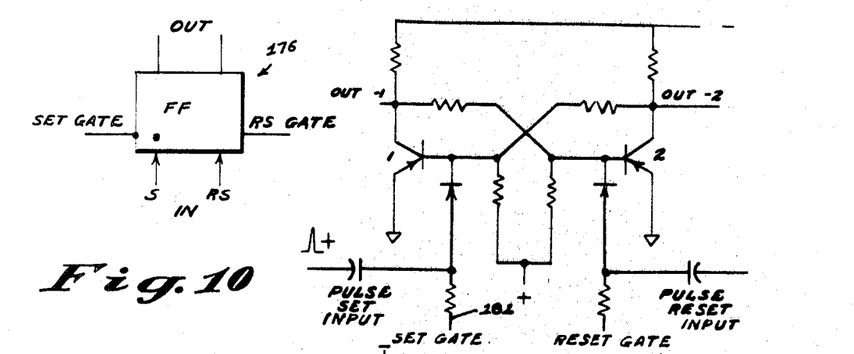
FIGURE 10 is an illustrative circuit diagram of a typical gated flip-flop circuit whose block diagram also appears in FIGURE 10 and which is used in the diagrams of FIGURES 4 and 5.
Figures 11, 12:
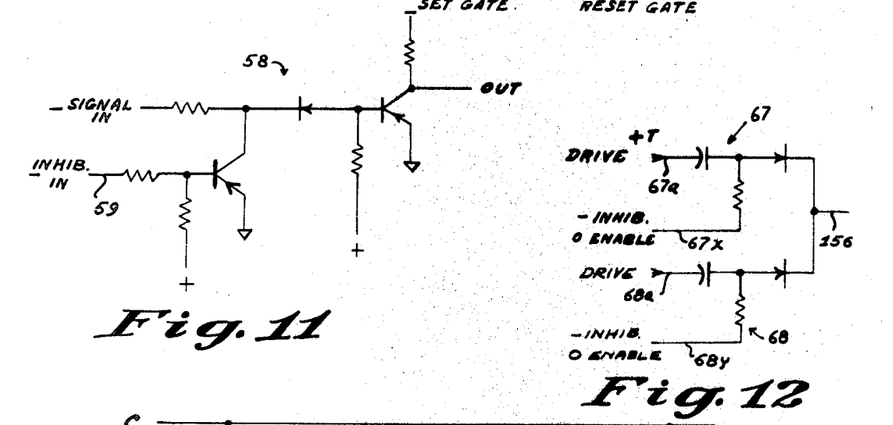
FIGURE 11 is a circuit diagram of a typical inhibit inverter.
FIGURE 12 is a circuit diagram of the dual inhibit ALARM-NORMAL, gate shown in block diagram form in FIGURE 5.

The chart illustrated in FIGURE 9 clarifies the relationship between the inputs to the stop-start gate and the condition of the gate iself, in addition to showing the status or operation of other portions of the monitor station, such as the transmitter. Unless the stop pulse voltage on one of the gate inputs 67a or 68a is admitted through the stop-start gate there is no voltage present on the line 157 interconnecting the output of the gate with the STOP (reset) input 156 of a flip-flop circuit 158 which is the initial stage in the stop-start, detector, and indicator circuitry of the inventive system.

Before further discussing the operation of the system apparatus with respect to alarm and outage responses, attention is directed to the indicator means and its operation. Three indicators N, A, and X are provided as final outputs of the indicator means 70 to apprise the operating personnel of significant changes in the status of any of the remote stations being monitored. The operator is advised of the occurance of an alarm or outage condition by the activation of the alarm or outage indicators. The operator is also signalled by the normal indicator N whenever a remote station returns from an alarm or outage condition to normal. Other than these three mentioned indications there is not output from the three indicators with the possible exception of a test indication. The operator, by actuating the acknowledge switch 194 for a particular station, can observe the actuation of the normal indicator for that station if conditions are in fact normal, but such procedure is performed only for test purposes and will be more fully understood as the description proceeds. As illustrated in FIGURE 5, the three indicators, preferably lights, are each connected in series with the collector supply voltage of PNP inverter stages 160, 161, and 162 respectively. These three indicator inverters are normally OFF and collector current does not flow to illuminate the respective indicator lights N, A, and X; however, when one of the inverters is turned on by a negative input voltage to the base of the inverter transistor, the appropriate indicator is turned on by the flow of collector current through the collector voltage supply and the series light. Each of the respective indicator channel inverters 160, 161, and 162, has respectively in series therewith, a normally ON inverter 163, 164, and 165, and respectively a normally inhibited—normally OFF inverter 166, 167, and 168. The drive-shorting or inhibiting transistor of each of the latter mentioned inverters is biased to a normally ON condition which inhibits, or shorts out, all drive pulses which appear at the inverter transistor base input, thus keeping the inverters 166, 167, and 168 normally shut off (see FIGURE 11). The normally inhibited inverters are each enabled by the appearance at the base input of the inhibit transistor in each inverter of a positive voltage which turns off the inhibit transistor. Such an enabling voltage is supplied to the inhibit input of the initial N channel inverter 166 either from the output of a delay multivibrator 178 or the stop-start flip-flop circuits 158 through an enable readout OR gate 169. The other inhibit inverters 167 and 168 of the A and X indicator channels however derive their inhibit voltage inputs from the respective outputs of a pair of diode OR gates 171 and 172. In addition to supplying the inhibit input voltage to the N channel, the output of the readout enable gate 169 is also supplied to one input of each of the OR gates 171 and 172 with the other of the two inputs to each of these OR gates coming from the RETURN-TO-NORMAL output bus 174 of the memory circuitry. Since the NORMAL output bus 174 is negative its presence at one input of the A and X channel OR gates 171 and 172 will cause a negative output from the gates and the inhibited condition of the initial inverters 167 and 168 in the A and X indicator channels will continue. Thus when a return to normal condition is indicated by the presence of a negative voltage on the RETURN-TO-NORMAL bus 174 both the A and X channels are barred from any indication whatever irrespective of drive inputs to those channels from the alarm-outage detector flip-flop circuit 176. As will be explained later, when a return to normal condition is indicated a transmission stoppage is made to occur the same as when an alarm condition first appears. The same events which produce the transmission stoppage produce an output of positive going voltage from the readout enable gate 169 and the N channel inhibit inverter is thereby enabled and at the same time is turned on by the RETURN-TO-NORMAL output bus voltage on line 174, thus actuating the NORMAL indicator light N.

Having described the function of the ALARM-NORMAL gates 67 and 68 and the indicator circuitry it will now be shown how those gates, the memory register 84 and the indicators A, X, and N are interrelated.

The previous explanation has already indicated that normal reply pulses 8N act only to inhibit the passage of stop pulses 57 through the stop-start gate and do not normally act to produce an indication of remote station condition. However, the failure of a normal reply pulse 8N to arrive at the ALARM gate 67 permits the stop pulse to pass therethrough and into the stop (reset) input of a flip-flop circuit 158 which produces a positive going output from the "set" side 159 of the circuit that is directed to the input of a normally ON delay multivibrator 178 (normally having zero voltage output) and to one of the inputs to the readout-enable OR gate 169. When the voltage on the "set" output 159 of the flip-flop circuit 158 goes in a positive direction to zero volts the "reset" output 157 of the same circuit goes to a negative value to establish the "stop signal" which has been referred to earlier in the disclosure. The stop signal is introduced through the OR gate 116 to the inhibit input of the timing gate inverter 58 on a line B interconnecting the later point with the flip-flop circuit output 157. During the time of application of the stop signal voltage to the timing gate inverter transmission of interrogation pulses is abated.

The input to the delay multivibrator 178 causes its output to become negative for a period of waiting time sufficient for the receipt of a delayed alarm reply pulse 8A if one is going to appear. In the illustrated embodiment this time is chosen as seventy-five milliseconds, although this length of time is not critical. The negative output from the delay multivibrator 178 is applied for the seventy-five milliseconds to the input of the recognition gate which comprises an inverter stage 180 and the set gate of the gated detector flip-flop circuit 176. At the time the voltage on the set gate input 181 is reduced to zero the detector flip-flop circuit 176 is enabled and thereby is susceptible to actuation by an input voltage appearing on the connection 183 between the set input of the flip-flop circuit 176 and the output of the first receiver logic inverter 141. If, during the seventy-five millisecond enabling period, a delayed reply pulse 8A arrives at the monitor receiver it is effective to turn on the said first inverter 141 causing the positive going output therefrom to trigger the enabled detector flip-flop circuit 176 and thereby causing an output to appear on the "set" or "alarm" side 185 of the flip-flop. The detector flip-flop "set" output 185 is connected to the drive input of the indicator's A channel inhibit inverter 167 and if the inhibit condition is removed, the drive input causes the alarm indicator A to be activated as previously explained. The inhibited condition of the inverter 167 is not removed until the end of the seventy-five millisecond waiting period when the output of the delay multivibrator 178 which is connected to one input of the readout enable gate 169, becomes zero thus making both of the inputs to the gate 171 at zero voltage and its output zero.

If, at the end of the seventy-five millisecond waiting period a reply pulse has not appeared to trigger the detector flip-flop 176 out of its normal dwell condition of a negative voltage output from the "X" or "reset" side, this reset output will cause the X channel inhibit inverter 168 to turn on when the negative inhibit voltage is removed therefrom similarly as it is from the A channel inhibit inverter. The turning o nthe X channel inhibit inverter 168 will cause the X channel indicator to illuminate, thus signalling an outage condition to the operator.

The positive going output occurring after the seventy-five millisecond delay from the delay multivibrator 178 is also directed to the activating input of a short period (ten milliseconds, for example) delay multivibrator 187, whose pulse output initiates the printer drive cycle. As for the printer equipment, a number of different state of the art printer devices are acceptable and in fact the recording operation can be done manually by the operator. In a typical monitor system information such as time, type of indication received, and the identity of the station effected is permanently recorded. If automatic equipment is employed the inputs to the equipment can be easily taken from appropriate sources in the system and in view of the usual practice of those skilled in the art, further description of such a device will not be given.

At the conclusion of the recording and acknowledge time interval, whether determined manually or automatically, the scanning of remote stations is resumed when a voltage input is applied to the "start" (set) side of the start-stop flip-flop circuit 158. If fully automatic means are employed to regulate the length of time given to recording and acknowledging the alarm a delay multivibrator (not shown) could be utilized to provide the voltage input signal, while if the time duration is manually controlled a switch, such as the one shown in FIGURE 5 and referred to as 189 can be utilized to effect the application of a "start" voltage to the set input of the flip-flop circuit 158. When the said flip-flop 158 is thus triggered the negative stop signal voltage is removed from its "reset" output 157 and the transmission of interrogation pulses is again resumed. It is apparent that if the detector flip-flop 176 has been triggered by an alarm pulse it is now reset to its normal dwell position by the positive going voltage on the line 157 inter-connecting the reset output of the start-stop flip-flop 158 and the reset input of the detector flip-flop 176.

Once the alarm or outage condition of a remote station is announced and its presence is acknowledged and recorded it is not necessary that the same condition be reported on subsequent scans by the interrogating pulses. Therefore, to insure transmission which is uninterrupted by stations having previously reported an alarm an artificial normal reply pulse is applied to the input 68y of the NORMAL gate 68 by a memory register means 84 each time that the transmitted scan interrogates the remote station or stations which are already acknowledged as being in an alarm or outage condition.

The memory register can take many forms which are familiar to those skilled in the art, such as a magnetic core matrix which is fully automatic, or a counter type utilizing manually operated acknowledge switches. The latter, being the least costly for a moderate sized system, will be explained as part of the preferred embodiment.

Figure 13:
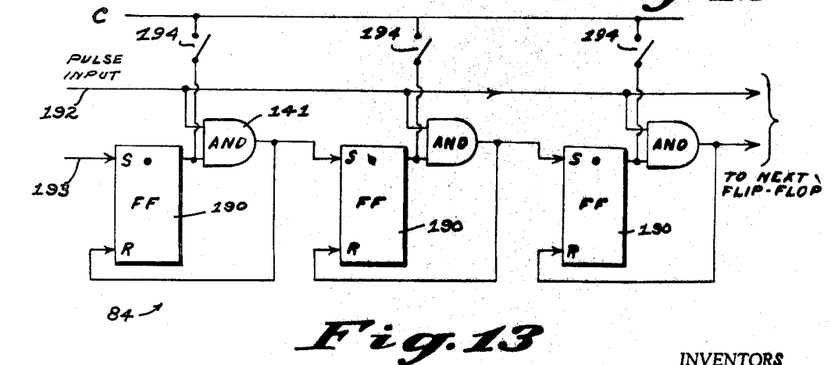
FIGURE 13 is a more illustrative detail diagram of a portion of a typical counting circuit which may be employed in the memory register shown in FIGURE 4.

One typical form of register is shown in FIGURE 13 and comprises a plurality of flip-flop circuits 190 and AND gates 141 interconnected to form a linear counter mechanism having a common set input 192 from the output of the monitor transmitter counter inverter 111 and a reset input 193 derived through inverter 132 from the reset pulse generator, the one millisecond delay multivibrator 130. Each incoming interrogation pulse to the counter advances the count to the next higher storage unit or flip-flop. The set input voltage to the succeeding flip-flop circuit is also directed to the wiper arm of a normally open switch 194 representing the remote station which corresponds in number to the count indicated by the particular set input to which the switch is connected. An alarm or outage condition is acknowledged by the operator by closing the switch having correspondence to the remote station indicating the alarm. When, during the next and succeeding scans, the negative set output voltage from the particular flip-flop 190 appears on the wiper arm of the particular acknowledge switch 194 it is passed through the closed switch contacts and into a normally OFF memory register inverter 153. This input turns the inverter 153 ON and with its voltage output removed it has no effect on the NOR gate 148 and the following inverter 147, the latter of which maintains the inhibit voltage on the NORMAL gate 68 and prevents the passage of stop pulses 57 therethrough.

Following the register inverter 153 is a normally ON second register inverter 196 which is turned off by the disappearance of the output voltage from the first register inverter 153. The negative output voltage from the OFF second register inverter 196 is applied to the stop-start OR gate 143 which passes therethrough in like manner to a genuine normal reply pulse and with the same effective inhibiting of the stop pulse 57 at the ALARM gate 67.

In order that the stored information in the memory unit may be removed, either by magnetic erasure in the case of a matrix register or by the opening of an appropriate switch in the linear counter system, an indication response to a return-to-normal condition is provided for. After the return of a remote station to normal condition and the reappearance of a normal reply pulse 8N in the monitor receiver, the first receiver inverter 141 turns on together with the simultaneous turning ON of the first register inverter 153 as a result of the artificial normal pulse from the memory register. The result of both of these inverters being on is to eliminate any voltage input to the NOR gate 148 and cause the normal gate inverter 147 to turn on and remove the inhibit voltage from the NORMAL gate 68. As is now well understood, the removal of the inhibit input voltage on the inhibit input 68y allows the next incoming stop pulse to pass through the stop-start gate and trigger the stop-start flip-flop circuit 158 which again terminates the scan transmission and initiates the recording cycle. Having triggered the stop-start flip-flop 158 and produced a zero voltage output from the readout enable gate 169 the indicator channel is enabled and is responsive to the negative voltage on the RETURN-TO-NORMAL bus 174 which comes directly from the turned OFF second register inverter 196 during the presence of the negative output from the particular counting stage which was providing an output when the transmission was terminated.

*Central Monitor Transmitter and Receiver*

Figure 6:
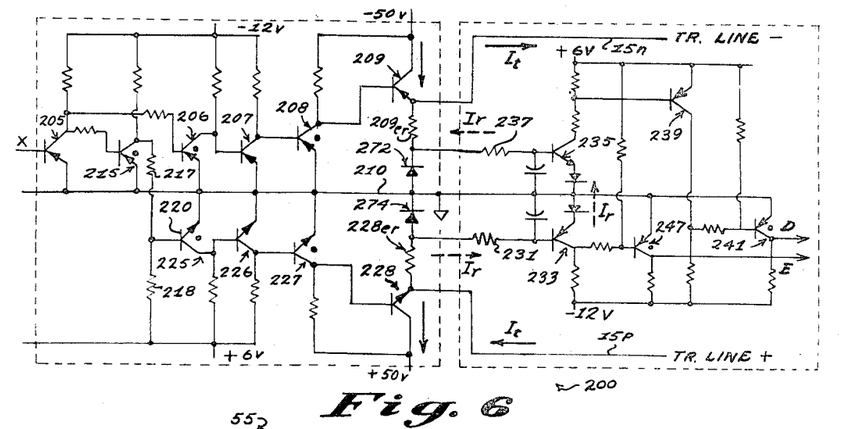
FIGURE 6 is a circuit diagram of the transmitter and receiver.

A detailed circuit diagram of the transmitter and receiver circuitry 200 is shown in FIGURE 6. From the transmitter drivers 201 and 202 the interrogating pulse signals are fed to successive stages 205, 206, 207, 208, and 209 of amplification preparatory for transmission onto the transmission line 15. The transmission line is preferably a two wire system balanced with respect to ground 210. Since direct current is the sole consideration in the present system the two wires of the transmission line may be respectively referred to as the plus line 15p and the negative line 15n. As a pulse appears at the input of the first driver inverter 201 that inverter is turned on and the next inverter 202 is turned off, producing a negative voltage input to the first of the said successive stages of PNP transistor inverters in the transmitter. The negative input voltage turns the first transmitter transistor inverter 205 ON, the next stage 206 OFF, the next stage 207 ON, and the last inverter stage 208 OFF. The negative voltage output is then fed to an emitter follower 209 and transmitted onto the negative side of the line 15n as a 50 volt negative pulse.

The output of the first transmitter inverter stage 205 is also used as the input to a polarity converting transistor stage 215 whose collector is connected to a positive voltage source through a voltage divider network comprised of two series resistors 217 and 218, the point between which is connected to the base 220 of the first of successive stages of NPN transistor inverters. When the conversion transistor 215 turns OFF its collector assumes a negative potential and the first stage NPN transistor 225 turns OFF similarly to its PNP counter part 206 on the other side of the circuit. The turning OFF of the first NPN stage 225 turns ON the second NPN stage 226 which turns OFF the third NPN stage 227, resulting in a positive output to the emitter follower stage 228 which is connected directly to the positive line 15p of the transmission pair 15. A fifty volt positive pulse with respect to ground from the emitter follower 228 results in a total pulse magnitude of one hundred volts as measured between the two transmission lines 15n and 15p. The current path (electron flow) of the transmitted signal is shown in FIGURE 6 with solid lines identified by the reference character $I_t$.

The current path (electron flow) of the returning reply pulse is shown in the drawing of FIGURE 6 and is identified by dotted arrows which are referred to as $I_r$. The current path is traced through the NPN emitter resistor 228er, a base input resistor 231, a PNP control resistor 233, through a pair of series diodes and a second control transistor 235 of the NPN type, through its base input resistor 237 and the other emitter resistor 209er and to the other side of the transmission line. The current flow $I_r$ turns ON two control inverter transistors 233 and 235. This turning ON of the NPN control transistors 235 also turns on a second series connected control stage 239 comprised of a PNP transistor which functions to turn OFF a third inverter 241 whose transistor collector is connected to the D input of the receiver OR gate 245. The turning OFF of the third inverter 241 produces a voltage output to the receiver logic circuitry through the OR gate 245. A similar E input to the OR gate 245 comes from the collector of an inverter stage 247 which is series connected to the output of one of the first control inverters 233. It will be evident that both the D and the E inputs to the OR gate 245 are not necessary for the presence of a signal at the output of the OR gate, however, should one of the transmission lines 15n or 15p become grounded, opened, or otherwise inoperative the other side of the line and the common ground would supply a signal to the logic circuits without interruption.

The arrangement of circuitry which allows the two transmission lines 15n and 15p to be connected to both the transmitter and receiver while at the same time preventing the unwanted reception by the receiver of the transmitter's output is another one of the novel aspects of the present invention. It will be noted that the transmitter output current $I_t$ (electron flow) flows in the same direction as the reply pulse current $I_r$, however, the direction of source current through the emitter follower resistance loads 209er and 228er is such that branch current flow through the receiver control transistors 223 and 235 cannot occur, being shunted by diodes 272 and 274 and the receiver therefore cannot be turned on by outgoing transmitter energy, as represented by the current arrows $I_t$.

*Remote stations*

The important and significant features of the remote stations have been largely covered in the earlier portion of the specification entitled "Summary of Invention"; however, a few additional observations will be made to further explain this portion of the system.

Each of the remote stations are identical and are interconnected in electrical parallel by the single transmission line 15. The sole function of each remote station 20 (FIGURE 2) is to transmit a reply pulse 8 following a given one of the received interrogating pulses, all of which are received by each remote station. The remote station counter unit or programmer 26 is preferably a straight binary chain counter which produces an output only when the count has been advanced to the permanently present count for that station. The output from the counter actuates the pulse generator 28 which may be a delay multivibrator which, for the fifteen cycle per second interrogating frequency, has an operating duration of twenty milliseconds, thus creating a reply pulse having a width of approximately sixty percent of the interrogating pulse train space time. The reply pulse is made narrower than the space time to compensate for the inherent RC delay in long transmission lines.

During "normal" conditions of the switch 35 the reply pulse is not delayed purposely and arrives at the central monitor station receiver 9 in time to be properly identified. A delay means 44 is switched into a series connection with the reply pulse during alarm conditions and prevents the pulse from arriving at the central monitor station within the normal time limit $t_1$.

A slightly modified form of remote station construction is shown in block diagram form in FIGURE 14 and although it is arranged differently from the simplified version shown in FIGURE 2 it is similar in its operating principle.

Frequently requirements exist for monitoring more than one condition at a single physical location, such as a store or factory, and the flexible nature of the present invention permits this to be done with a minimal increase in the remote station apparatus. The exemplary diagram of FIGURE 14 depicts three condition or limit switches 255, each having a normally closed NORMAL contact $N_1$, etc., and a normally open ALARM contact $A_1$, etc. The respective wiper arms of each of these condition switches is connected to the output of a selected stage of the programmer or counter 26M which represents that numbered interrogation pulse to which it is desired that the particular condition switch be responsive. Thus, if condition switch number 1 were programmed to be interrogated as to its position by the 23rd interrogation pulse in the scan, the programmer 26M would provide an output to the switch wiper arm when its 23rd bit storage unit was activated. Any number of other condition switches may be connected to the programmer so as to receive an output at the time a chosen count is reached within the programmer.

Outputs from the multiple condition programmer 26M which pass through the normally closed NORMAL contacts of the condition switches 255 are separately applied to an OR gate 260 which isolates the inputs from one another but at the same time applies them to the single input of the reply pulse generator, a delay multivibrator 264 whose output pulse is applied to the remote station transmitter 38 for transmission to the monitor station 2.

During an alarm condition, however, the wiper arm of the effected condition switch applies the programmer output voltage to the normally open ALARM contact of the switch from which it is sent to a delay input OR gate 268. The OR gate output is effectively delayed for a given length of time by a delay multivibrator 270 whose output is also applied to an input of the pulse generator OR gate 260. The alarm delay multivibrator 270 delays the generation of the reply pulse so that it will fall outside the time limit $t_1$ for a normal pulse.

Figure 15:
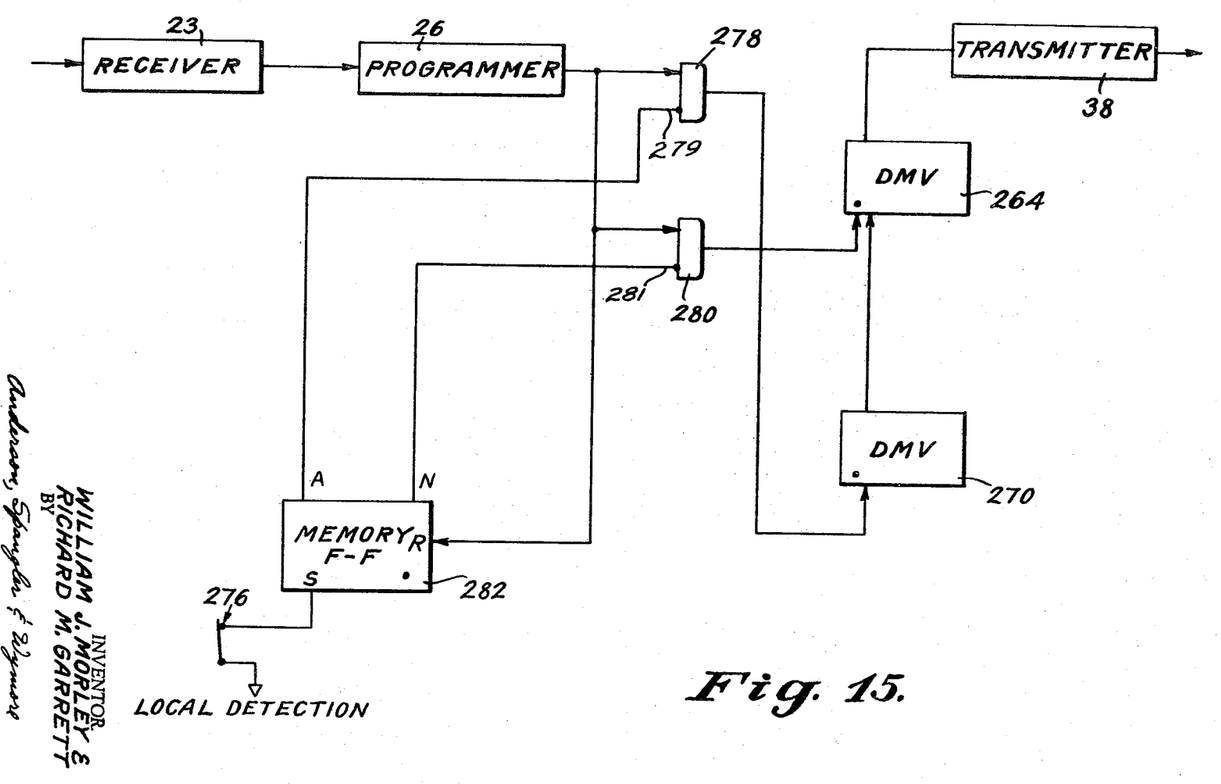
FIGURE 15 is a block diagram of a typical remote station including a means for sensing, storing and identifying a momentary alarm condition.

The block diagram of FIGURE 15 illustrates one form of a remote station, similar in operating principle to that of FIGURE 2, which includes means for the sensing, storage and identification of an alarm condition occurring momentarily at such remote station.

Where an alarm condition occurs at a remote station after interrogation of that station and the alarm condition is removed prior to the subsequent interrogation of that station, it is frequently desirable that such alarm condition be identified at the central monitor. Such an alarm may result from the opening of a switch adapted to open say on the opening of a door. If such door is opened and then closed between interrogations, the remote station of FIGURE 2 would not identify the momentary alarm. Referring now to FIGURE 15, a condition or limit switch 276, shown normally closed, provides the local detection function. With switch 276 as shown, the receipt of the interrogation signal by receiver 23 to which programmer 26 is responsive produces an output therefrom. The output from programmer 26 is applied to one input of INHIBIT gates 278 and 280 having inhibit inputs 279 and 281 respectively. The output of programmer is also applied to a reset input R of memory flip-flop 282. The outputs of the memory flip-flop 282 are connected to INHIBIT inputs of gates 278 and 280 with the output N from the normally on side of the flip-flop in the reset condition being connected to gate 280 and the output A from the normally off side of the flip-flop being connected to gate 278. The set input of the memory flip-flop is connected to ground potential serially through switch 276.

As shown, an output signal appears at the A output of the flip-flop 282 and is applied to inhibit input 279 of INHIBIT gate 278 inhibiting passage of a signal therethrough. When a signal appears on the output of programmer 26 in response to interrogation, the absence of a signal being applied to input 281 of gate 280 permits the signal to pass through gate 280 directly to the short term delay multivibrator or reply pulse generator 264 for the transmission by transmitter 38.

When condition or limit switch 276 is opened, the flip-flop 282 is flipped and an output is present at the N output. The flip-flop will remain flipped until reset by a signal applied to the reset input R and only when switch 276 is closed or made-up. Once switch 276 is opened, even momentarily, the flip-flop 282 is flipped producing an output on output N thereof, closing gate 280 and opening gate 278 so that a signal from programmer 26 passes through gate 278 to the long term or alarm delay multivibrator 270 and then to the short term delay multivibrator 264 for transmission by transmitter 38. The alarm delay multivibrator 270 delays the generation of the reply pulse so that it falls outside the time limit $t_1$ for a normal reply pulse.

It should be noted that the reset function of flip-flop 282 is responsive to the trailing edge of the signal from programmer 26 as applied to input R. Thus, where switch 276 is momentarily opened and then closed intermediate the interrogations of the particular station, the flip-flop 282 being in flipped condition will cause an alarm condition pulse to be transmitted in response to the signal from the programmer. If switch 276 is now closed, the flip-flop is reset by the trailing edge of such signal and the next interrogation will provide a normal reply pulse. The momentary alarm condition has been indicated however at the central monitor and the circuit of FIGURE 15 provides means for storing and reporting an alarm condition until the next interrogation even though the alarm condition is no longer existing at the time of interrogation. Other arrangements such as a snap-action switch could serve as a storage means with manual or automatic reset being used to return to normal.

It is important to note that in contrast to prior art systems where the pulses and spaces in the address or interrogation signals are both integral bits of the total address, the interrogation of the present system may be interrupted at any selected point for purposes of identity, control and the like, and the interrogation picked up at the point of interruption without loss of syncronization or the necessity of initiating a new interrogation cycle. Thus the efficiency of the present system is greatly improved over presently known systems.

Having thus described the several useful and novel features of the telemetry system of the present invention in connection with the accompanying drawings, it will be seen that the many worthwhile objectives for which it was designed have been achieved. Although but one of the several possible embodiments of the invention has been illustrated and described herein, we realize that certain additional modifications may well occur to those skilled in the art within the broad teaching hereof; hence, it is our intention that the scope of protection afforded hereby shall be limited only insofar as said limitations are expressly set forth in the appended claims.

We claim:
1. In a supervisory system including a central monitor station and at least one remote station, a remote station comprising;
   receiving means having an output for receiving a train of electrical pulses from the central monitor station;
   contour means connected to the output of said receiver means and adapted to provide an electrical output at a predetermined count of the said received electrical pulses;
   a pulse generator means responsive to the output of the counter means;
   transmitter means;
   electrical delay means connected to an input of the transmitter means; and
   switch means for selectively directing the output of the pulse generator directly to the said transmitter means or to the delay means, said switch means normally directing said pulse generator output to the transmitter means and being responsive to an alarm condition to direct the said pulse generator output to the delay means.

2. The supervisory system of claim 1, wherein the switch means further includes;
   means adapted to respond to a momentary alarm condition to direct the said pulse generator output to the delay means.

References Cited

UNITED STATES PATENTS

| | | | |
|---|---|---|---|
| 2,794,179 | 5/1957 | Sibley | 340—163 |
| 2,955,278 | 10/1960 | Sibley | 340—163 |
| 2,980,898 | 4/1961 | Mason et al. | 340—408 |
| 3,048,820 | 8/1962 | Derr et al. | 340—163 |
| 3,107,340 | 10/1963 | Silliman et al. | 340—163 |
| 3,122,723 | 2/1964 | Coley et al. | 340—164 |
| 3,171,108 | 2/1965 | MacKeen | 340—408 |
| 3,214,734 | 10/1965 | Whitehead | 340—163 |

JOHN W. CALDWELL, *Primary Examiner.*

NEIL C. READ, THOMAS B. HABECKER, *Examiners.*

H. PITTS, *Assistant Examiner.*

UNITED STATES PATENT OFFICE
CERTIFICATE OF CORRECTION

Patent No. 3,384,874   Dated May 21, 1968

Inventor(s) William J. Morley and Richard M. Garrett

It is certified that error appears in the above-identified patent and that said Letters Patent are hereby corrected as shown below:

Column 18, line 14, change "contour" to --counter--.

Signed and sealed this 19th day of September 1972.

(SEAL)
Attest:

EDWARD M. FLETCHER, JR.
Attesting Officer

ROBERT GOTTSCHALK
Commissioner of Patents